United States Patent
Zeng

(10) Patent No.: US 11,151,700 B2
(45) Date of Patent: Oct. 19, 2021

(54) IMAGE PROCESSING METHOD, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 160 days.

(21) Appl. No.: 16/706,659

(22) Filed: Dec. 6, 2019

(65) Prior Publication Data

US 2020/0118257 A1   Apr. 16, 2020

Related U.S. Application Data

(63) Continuation of application No. PCT/CN2018/090590, filed on Jun. 11, 2018.

(30) Foreign Application Priority Data

Jun. 16, 2017   (CN) .......................... 201710459547.1

(51) Int. Cl.
*G06T 7/00* (2017.01)
*G06T 5/00* (2006.01)
(Continued)

(52) U.S. Cl.
CPC .............. *G06T 5/008* (2013.01); *G06T 5/009* (2013.01); *H04N 5/2355* (2013.01);
(Continued)

(58) Field of Classification Search
CPC . G06T 5/008; G06T 5/00; G06T 2207/10028; G06T 2207/20021;
(Continued)

(56) References Cited

U.S. PATENT DOCUMENTS 8,089,525 B2    1/2012  Takayama
8,885,937 B2 *  11/2014 Yi .............................. G06T 5/40
                                                              382/168
(Continued)

FOREIGN PATENT DOCUMENTS

CN          101340523 A       1/2009
CN          101472188 A       7/2009
(Continued)

OTHER PUBLICATIONS

English translation of International search report issued in corresponding international application No. PCT/CN2018/090590, dated Aug. 31, 2018 (2 pages).
(Continued)

*Primary Examiner* — Li Liu
(74) *Attorney, Agent, or Firm* — Young Basile Hanlon & MacFarlane, P.C.

(57) ABSTRACT

An image processing method, a terminal, and a non-transitory computer-readable storage medium are disclosed. The method includes: obtaining a first exposure compensation value from a global portion of an image; obtaining a second exposure compensation value from a portrait portion of the image; obtaining a final exposure compensation value according to the first exposure compensation value and the second exposure compensation value; and processing, according to the final exposure compensation value, exposure compensation to the image.

11 Claims, 5 Drawing Sheets

(51) Int. Cl.
*H04N 5/235* (2006.01)
*H04N 5/225* (2006.01)

(52) U.S. Cl.
CPC ............ *G06T 2207/10024* (2013.01); *G06T 2207/10028* (2013.01); *G06T 2207/20208* (2013.01); *G06T 2207/30201* (2013.01); *H04N 5/2252* (2013.01)

(58) Field of Classification Search
CPC .......... G06T 2207/30201; G06T 5/007; G06T 5/009; G06T 7/194; H04N 5/2351; H04N 5/23219; H04N 5/2352; G06K 9/00268
See application file for complete search history.

(56) References Cited

U.S. PATENT DOCUMENTS

| | | | | |
|---|---|---|---|---|
| 2005/0141002 | A1* | 6/2005 | Takano | H04N 1/6027 358/1.9 |
| 2008/0075384 | A1* | 3/2008 | Chung | G06T 5/008 382/274 |
| 2010/0085361 | A1* | 4/2010 | Kim | G06T 5/008 345/428 |
| 2010/0329558 | A1 | 12/2010 | Saquib et al. | |
| 2011/0052175 | A1* | 3/2011 | Shih | G03B 7/08 396/234 |
| 2011/0249961 | A1* | 10/2011 | Brunner | H04N 5/23216 396/213 |
| 2011/0293259 | A1* | 12/2011 | Doepke | H04N 5/23216 396/236 |
| 2014/0267841 | A1* | 9/2014 | Sasaki | H04N 5/2355 348/255 |
| 2015/0139510 | A1 | 5/2015 | Krishnaswamy | |
| 2016/0156825 | A1* | 6/2016 | Dallas | H04N 5/2355 348/362 |
| 2019/0139198 | A1* | 5/2019 | Hu | G06T 7/11 |

FOREIGN PATENT DOCUMENTS

| | | |
|---|---|---|
| CN | 101527860 A | 9/2009 |
| CN | 101719989 A | 6/2010 |
| CN | 101719989 B | 11/2014 |
| CN | 105516613 A | 4/2016 |
| CN | 105791709 A | 7/2016 |
| CN | 106210523 A | 12/2016 |
| CN | 106331510 A | 1/2017 |
| CN | 106851124 A | 6/2017 |
| CN | 107220953 A | 9/2017 |
| JP | 4307341 B2 | 8/2009 |

OTHER PUBLICATIONS

English translation of First search report issued for a counterpart Chinese patent Application 201710459547.1, dated Apr. 23, 2019 (2 pages).
Indian First Examination Report for IN Application 201917052822 dated Apr. 5, 2021. (6 pages).
European search report, EP18818478, dated Feb. 2, 2020 (54 pages).

* cited by examiner

IMAGE PROCESSING METHOD, TERMINAL, AND NON-TRANSITORY COMPUTER-READABLE STORAGE MEDIUM

CROSS-REFERENCE TO RELATED APPLICATION(S)

This application is a continuation application of International Patent Application No. PCT/CN2018/090590, filed on Jun. 11, 2018, which claims priority to Chinese Patent Application No. 201710459547.1, filed on Jun. 16, 2017, the contents of both of which are herein incorporated by reference in their entireties.

TECHNICAL FIELD

The present disclosure relates to the field of terminals, and in particular, to an image processing method, a terminal, and a non-transitory computer-readable storage medium.

BACKGROUND

For a same object, brightness of reflected light is different under illumination of light sources having different brightness. Based on this, when an image acquisition apparatus acquires an image, it is affected by the light source in the environment, and thus a brightness value of each pixel point is deviated to some extent in the acquired image, thereby resulting in a poor visual effect.

SUMMARY

In some aspects of the present disclosure, an image processing method may be provided. The image processing method may include: obtaining a first exposure compensation value from a global portion of an image; obtaining a second exposure compensation value from a portrait portion of the image; obtaining a final exposure compensation value according to the first exposure compensation value and the second exposure compensation value; and processing, according to the final exposure compensation value, exposure compensation to the image.

In some aspects of the present disclosure, a terminal may be further provided. The terminal may include a housing, a camera module, a memory, and a processor. The camera module, the memory, and the processor may be disposed in the housing. The camera module may be configured to acquire an image. The memory may be configured to store a executable program. The processor may be configured to execute the executable program to cause the processor to execute an image processing method. The method may include: obtaining a first exposure compensation value from a global portion of the image; obtaining a second exposure compensation value from a portrait portion of the image; obtaining a final exposure compensation value according to the first exposure compensation value and the second exposure compensation value; and processing, according to the final exposure compensation value, exposure compensation to the image.

In some aspects of the present disclosure, a non-transitory computer-readable storage medium may be further provided. The non-transitory computer-readable storage medium stores a computer program which, when executed by a processor, cause the processor to execute an image processing method. The method may include: obtaining a first exposure compensation value from a global portion of an image; obtaining a second exposure compensation value from a portrait portion of the image; obtaining a final exposure compensation value according to the first exposure compensation value and the second exposure compensation value; and processing, according to the final exposure compensation value, exposure compensation to the image.

Parts of additional aspects and advantages of the present disclosure will be set forth in the following description. The parts will become apparent from the following description or get to know from the practice of the present disclosure.

BRIEF DESCRIPTION OF DRAWINGS

The above and/or additional aspects and advantages of the present disclosure will become apparent and readily understood from the description to the embodiments with reference to the drawings.

DETAILED DESCRIPTION

Figure 1:
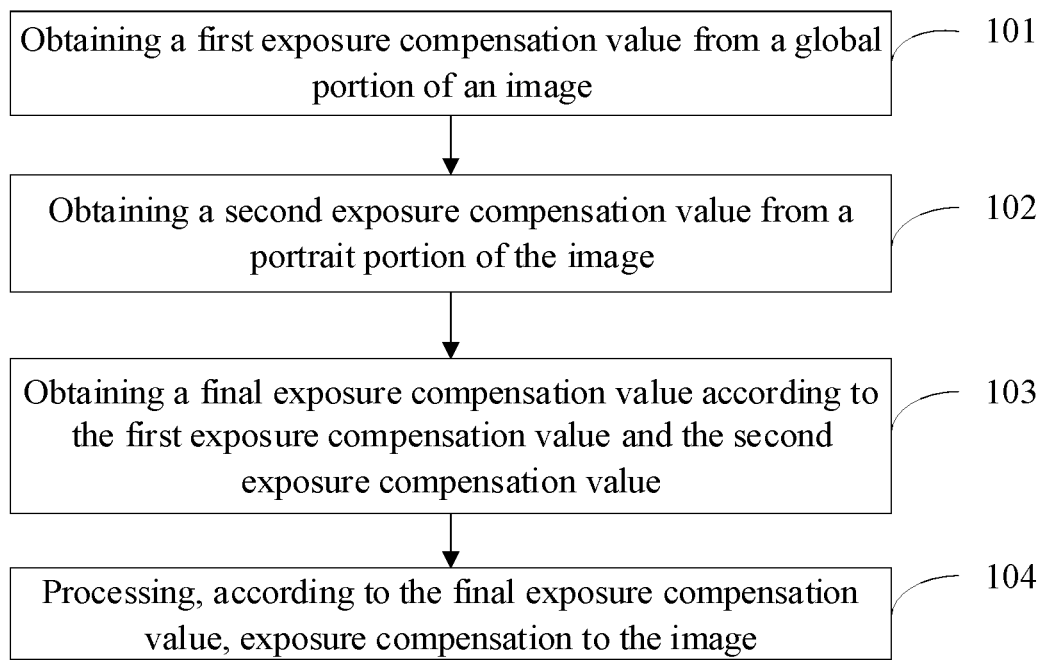
FIG. 1 is a flow chart of an image processing method according to some embodiments of the present disclosure.

The embodiments of the present disclosure will be described in detail below. Examples of the embodiments may be illustrated in the drawings. Same or similar reference numerals may be used to indicate same or similar elements or elements having same or similar functions. The embodiments described below with reference to the drawings are illustrative, and are not intended to be construed as limiting.

In some aspects of the present disclosure, an image processing method may be provided. The image processing method may include: obtaining a first exposure compensation value from a global portion of an image; obtaining a second exposure compensation value from a portrait portion of the image; obtaining a final exposure compensation value according to the first exposure compensation value and the second exposure compensation value; and processing, according to the final exposure compensation value, exposure compensation to the image.

In some embodiments, the obtaining the final exposure compensation value according to the first exposure compensation value and the second exposure compensation value, may include: determining, according to an area ratio of the portrait portion to the image, a first weight value corresponding to the first exposure compensation value and a second weight value corresponding to the second exposure compensation value; and acquiring a first product of the first exposure compensation value and the first weight value, acquiring a second product of the second exposure compensation value and the second weight value, and acquiring the final exposure compensation value by adding the first product to the second product.

In some embodiments, a sum of the first weight value and the second weight value is equal to 1, and the second weight value is positively correlated with the area ratio.

In some embodiments, the method may further include: acquiring a depth of field of the image; and extracting, according to the depth of field, the portrait portion of the image.

In some embodiments, the method may further include: performing a face detection on the image and acquiring a face detection result; acquiring the depth of field of the image in response to the face detection result indicating that the image includes a face; and determining the first exposure compensation value as the final exposure compensation value in response to the face detection result indicating that the image does not include a face.

In some embodiments, the acquiring the depth of field of the image may include: acquiring the depth of field of the image by using a dual-camera or a Red Green Blue Depth camera.

In some embodiments, the obtaining the final exposure compensation value according to the first exposure compensation value and the second exposure compensation value, may include: acquiring the final exposure compensation value by acquiring a weighted sum of the first exposure compensation value and the second exposure compensation value.

In some embodiments, the acquiring the final exposure compensation value by acquiring the weighted sum of the first exposure compensation value and the second exposure compensation value, comprises: obtaining an average value of the first exposure compensation value and the second exposure compensation value, and determining the average value as the final exposure compensation value.

In some embodiments, the obtaining the first exposure compensation value from the global portion of the image, may include: obtaining an average value of brightness values of all pixel points of the image; and determining the first exposure compensation value based on the average value.

In some embodiments, the obtaining the first exposure compensation value from the global portion of the image, may include: obtaining a maximum value of brightness values of all pixel points of the image; and determining the first exposure compensation value based on the maximum value.

In some aspects of the present disclosure, a terminal may be further provided. The terminal may include a housing, a camera module, a memory, and a processor. The camera module, the memory, and the processor may be disposed in the housing. The camera module may be configured to acquire an image. The memory may be configured to store a executable program. The processor may be configured to execute the executable program to cause the processor to execute an image processing method. The method may include: obtaining a first exposure compensation value from a global portion of the image; obtaining a second exposure compensation value from a portrait portion of the image; obtaining a final exposure compensation value according to the first exposure compensation value and the second exposure compensation value; and processing, according to the final exposure compensation value, exposure compensation to the image.

In some embodiments, the obtaining the final exposure compensation value according to the first exposure compensation value and the second exposure compensation value, may include: determining, according to an area ratio of the portrait portion to the image, a first weight value corresponding to the first exposure compensation value and a second weight value corresponding to the second exposure compensation value; wherein a sum of the first weight value and the second weight value is equal to 1, and the second weight value is positively correlated with the area ratio and acquiring a first product of the first exposure compensation value and the first weight value, acquiring a second product of the second exposure compensation value and the second weight value, and acquiring the final exposure compensation value by adding the first product to the second product.

In some embodiments, the method may further include: performing a face detection on the image and acquiring a face detection result; acquiring a depth of field of the image in response to the face detection result indicating that the image includes a face; and extracting, according to the depth of field, the portrait portion of the image.

In some embodiments, the obtaining the final exposure compensation value according to the first exposure compensation value and the second exposure compensation value, may include: acquiring the final exposure compensation value by acquiring a weighted sum of the first exposure compensation value and the second exposure compensation value.

In some embodiments, the acquiring the final exposure compensation value by acquiring the weighted sum of the first exposure compensation value and the second exposure compensation value, may include: obtaining an average value of the first exposure compensation value and the second exposure compensation value, and determining the average value as the final exposure compensation value.

In some aspects of the present disclosure, a non-transitory computer-readable storage medium may be further provided. The non-transitory computer-readable storage medium stores a computer program which, when executed by a processor, cause the processor to execute an image processing method. The method may include: obtaining a first exposure compensation value from a global portion of an image; obtaining a second exposure compensation value from a portrait portion of the image; obtaining a final exposure compensation value according to the first exposure compensation value and the second exposure compensation value; and processing, according to the final exposure compensation value, exposure compensation to the image.

An image processing method, an image processing apparatus, and a terminal according to some embodiments of the present disclosure may be described below with reference to the accompanying drawings.

FIG. 1 is a flow chart of an image processing method according to some embodiments of the present disclosure. The image processing method according to some embodiments of the present disclosure may be applied to various existing terminals (for example, tablet computers, notebook computers, personal computers, smart phones, and the like). As shown in FIG. 1, the image processing method may include operations executed by following blocks.

At block 101, a first exposure compensation value may be obtained from a global portion of an image.

More specifically, a photometric processing may be performed on the global portion of the image. The first exposure compensation value $T_{gain}$ may be obtained from the global portion of the image by using various exposure compensation methods (for example, an average method, a maximum method, and the like).

In case of using the average method to perform the exposure compensation process on the image, an average value of brightness values of all the pixel points of the entire image may be calculated. An exposure compensation parameter may be in turn determined according to the average value. After that, the acquired exposure compensation parameter may be used for the exposure compensation process of the image. In case of using the maximum method to perform the exposure compensation process on the image, a maximum value of the brightness values of all the pixel points of the entire image may be calculated. The exposure compensation parameter may be in turn determined according to the maximum value. After that, the acquired exposure compensation parameter may be used for the exposure compensation process of the image.

At block 102, a second exposure compensation value may be obtained from a portrait portion of the image.

More specifically, the photometric processing may be performed on the portrait portion of the image. The second exposure compensation value $F_{gain}$ may be acquired from the portrait portion of the image by using various exposure compensation methods (for example, the average method, the maximum method, and the like).

At block 103, a final exposure compensation value may be obtained according to the first exposure compensation value and the second exposure compensation value.

More specifically, the final exposure compensation value $L_{gain}$ may be determined by using the first exposure compensation value $T_{gain}$ obtained from the global portion of the image and the second exposure compensation value $F_{gain}$ obtained from the portrait portion of the image. More specifically, the final exposure compensation value $L_{gain}$ may be obtained by calculating the average value L of the first exposure compensation value $T_{gain}$ and the second exposure compensation value $F_{gain}$, that is, $L_{gain}$ ($T_{gain}$+$F_{gain}$)/2. The final exposure compensation value $L_{gain}$ may also be obtained according to a preset fixed weight $L_{gain}$=0.3$T_{gain}$+0.7$F_{gain}$. The final exposure compensation value $L_{gain}$ may also be obtained by using other methods.

At block 104, the image may be processed according to the final exposure compensation value. More specifically, exposure compensation may be processed to the image, according to the final exposure compensation value.

More specifically, the final exposure compensation value $L_{gain}$ obtained according to the block 103 may be used to perform the exposure compensation processing to the image, and the brightness of the portrait portion and the background portion in the image may be accurately restored.

In some embodiments, the exposure difference between the portrait portion and the background portion may be fully considered. The second exposure compensation value may be individually obtained from the portrait portion of the image. That is to say, the second exposure compensation for the portrait portion may be acquired independently/separately from the first exposure compensation for the global portion of the image. The final exposure compensation value may be acquired by combining the first exposure compensation value for the global portion of the image with the second exposure compensation value for the portrait portion of the image. The exposure compensation may be processed to image according to the final exposure compensation value. In this way, it is possible to achieve the accurate restoration of the brightness of the portrait portion and the background portion in the image, reduce the possibility that the portrait portion of the image is underexposed and the brightness is distinctly dark under the backlight condition, and a visual effect may be improved.

Figure 2:
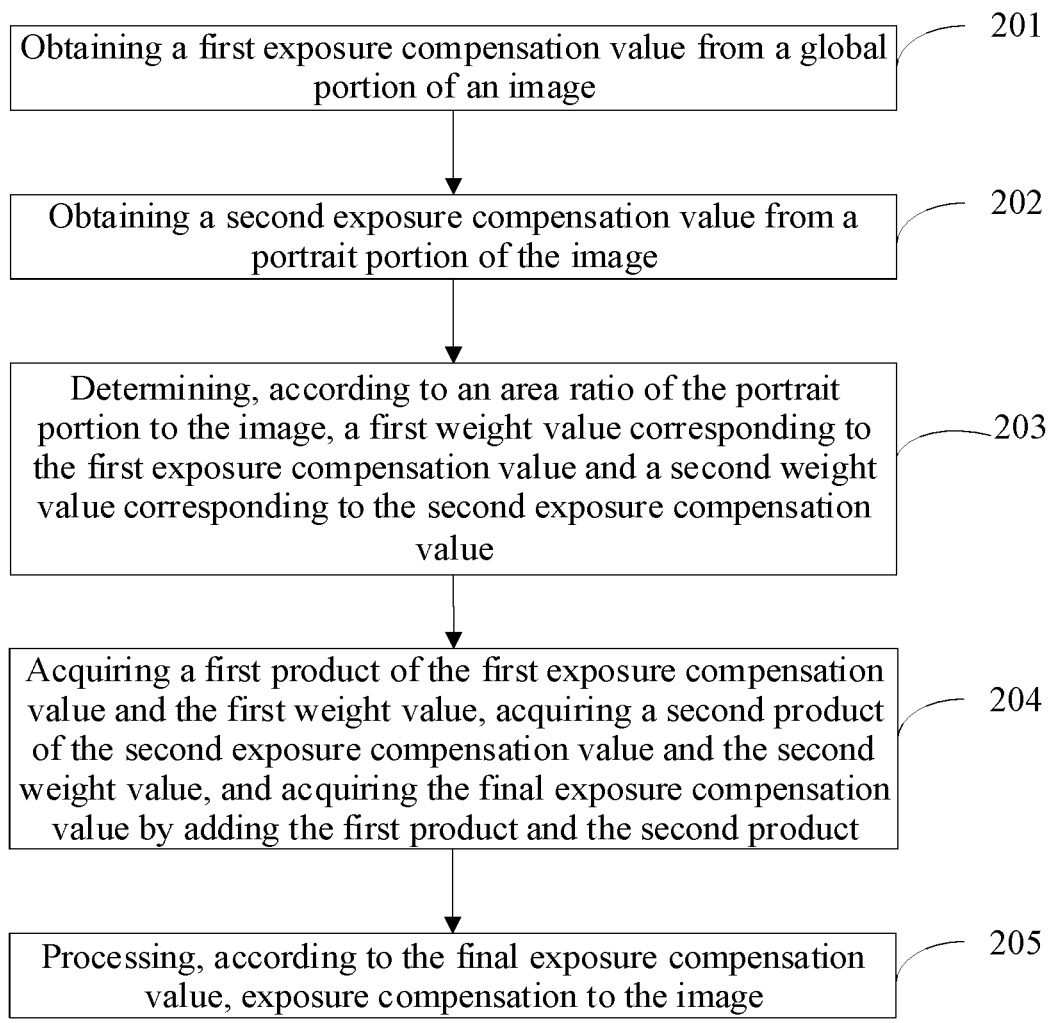
FIG. 2 is another flow chart of an image processing method according to some embodiments of the present disclosure.

In order to clearly illustrate the embodiments of the present disclosure, another image processing method may be further provided. FIG. 2 is another flow chart of an image processing method according to some embodiments of the present disclosure. As shown in FIG. 2, the image processing method may include operations executed by the following blocks.

At block 201, a first exposure compensation value may be obtained from a global portion of an image.

More specifically, the block 201 may be the same as the block 101 in the above embodiments, and details may be not described herein again.

At block 202, a second exposure compensation value may be obtained from a portrait portion of the image.

More specifically, the block 202 may be the same as the block 102 in the above embodiments, and details may be not described herein again.

The block 103 in the above embodiments may specifically include the following blocks 203 and 204.

At block 203, a first weight value corresponding to the first exposure compensation value and a second weight value corresponding to the second exposure compensation value may be respectively determined according to an area ratio of the portrait portion to the image.

More specifically, the area ratio m of the portrait portion to the image may be acquired. The first weight value 1−∂ corresponding to the first exposure compensation value $T_{gain}$ and the second weight value ∂ corresponding to the second exposure compensation value $F_{gain}$ may be determined according to the acquired area ratio m. In some embodiments, ∂ may be positively correlated with m.

At block 204, a product of the first exposure compensation value and the first weight value and a product of the second exposure compensation value and the second weight value may be added together to acquire the final exposure compensation value. That is, a first product of the first exposure compensation value and the first weight value may be acquired, a second product of the second exposure compensation value and the second weight value may be acquired, and the final exposure compensation value may be acquired by adding the first product to the second product.

More specifically, the final exposure compensation value may be calculated as follow: $L_{gain}=(1-∂)T_{gain}+∂F_{gain}$.

The greater the area ratio m of the portrait portion to the image, the greater the weight corresponding to the exposure compensation value for the portrait portion, and the less the weight corresponding to the exposure compensation for the background portion. Thus, the brightness of the portrait portion may be better restored with the final exposure compensation value. The less the area ratio m of the portrait portion to the image, the less the weight corresponding to the exposure compensation value for the portrait portion, and the greater the weight corresponding to the exposure compensation value for the background portion. Thus, the brightness of the background portion may be better restored with the final exposure compensation value.

At block 205, the image may be processed according to the final exposure compensation value. More specifically, exposure compensation may be processed to the image, according to the final exposure compensation value.

More specifically, the block 205 may be the same as the block 104 in the above embodiments, and details may be not described herein again.

Furthermore, the portrait portion of the image may be acquired by the following operations: acquiring a depth of field of the image, and extracting the portrait portion of the image according to the depth of field.

More specifically, the depth of field of the image may be acquired by using a dual-camera or a RGBD (Red Green Blue Depth) camera. An overall contour of the portrait portion of the image may be extracted according to the depth of field, and the portrait portion of the image may be acquired as a result.

Furthermore, before extracting the portrait portion of the image, the method may further include the following operations: performing a face detection on the image and acquiring a face detection result; acquiring the depth of field of the image in response to the face detection result indicating that the image includes a face, and extracting the portrait portion of the image according to the face detection result. When the face detection result indicates/includes that the image to be processed does not include a face, the final exposure compensation value $L_{gain}$ may be equal to the first exposure compensation value $T_{gain}$ of the global portion of the image to be processed, that is, when m=0 and ∂=0, $L_{gain}=T_{gain}$. Therefore, the first exposure compensation value may be determined as the final exposure compensation value, in response to the face detection result indicating that the image does not include a face.

In some embodiments, the exposure difference between the portrait portion and the background portion may be fully considered. The second exposure compensation value may be individually obtained from the portrait portion of the image. That is to say, the second exposure compensation for the portrait portion may be acquired independently/separately from the first exposure compensation for the global portion of the image. The final exposure compensation value may be acquired by combining the first exposure compensation value for the global portion of the image with the second exposure compensation value for the portrait portion of the image. The exposure compensation may be processed to image according to the final exposure compensation value. In this way, it is possible to achieve the accurate restoration of the brightness of the portrait portion and the background portion in the image, reduce the possibility that the portrait portion of the image is underexposed and the brightness is distinctly dark under the backlight condition, and the visual effect may be improved. By using the image processing method according to some embodiments, the second weight value of the second exposure compensation value for the portrait portion and the first weight value of the first exposure compensation value for the global portion of the image may be automatically set according to the area ratio of the portrait portion to the image. In this way, it is possible to accurately restore the brightness of the portrait portion and the background portion in the image according to different scenarios.

Figure 3:
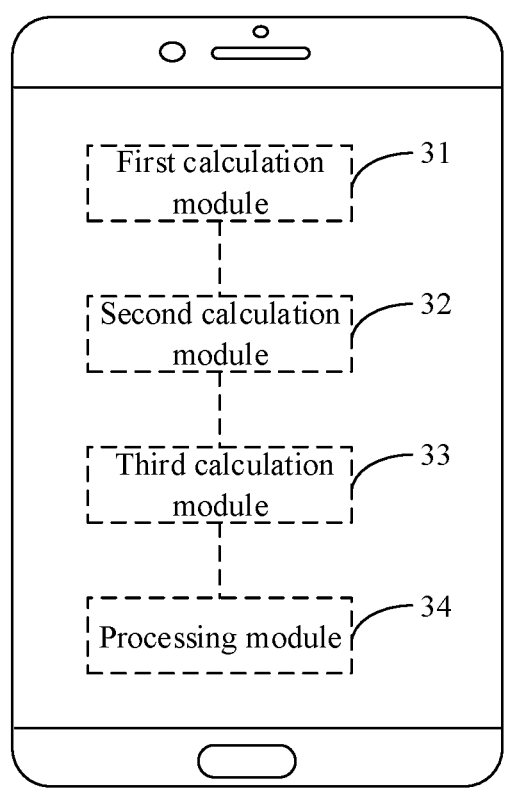
FIG. 3 is a schematic view of an image processing apparatus according to some embodiments of the present disclosure.

In order to implement the above embodiments, an image processing apparatus may be further provided in some embodiments of the present disclosure. FIG. 3 is a schematic view of an image processing apparatus according to some embodiments of the present disclosure. As shown in FIG. 3, the image processing apparatus may include a first calculation module 31, a second calculation module 32, a third calculation module 33, and a processing module 34.

The first calculation module 31 may be configured to obtain a first exposure compensation value from a global portion of an image.

The second calculation module 32 may be configured to obtain a second exposure compensation value from a portrait portion of the image.

The third calculation module 33 may be configured to obtain a final exposure compensation value according to the first exposure compensation value and the second exposure compensation value.

The processing module 34 may be configured to process exposure compensation to the image according to the final exposure compensation value.

It should be noted that, the explanation of the image processing method according to the above embodiments may also be applicable to the image processing apparatus according to some embodiments, and will not be repeated here.

In some embodiments, the exposure difference between the portrait portion and the background portion may be fully considered. The second exposure compensation value may be individually obtained from the portrait portion of the image. That is to say, the second exposure compensation for the portrait portion may be acquired independently/separately from the first exposure compensation for the global portion of the image. The final exposure compensation value may be acquired by combining the first exposure compensation value for the global portion of the image with the second exposure compensation value for the portrait portion of the image. The exposure compensation may be processed to image according to the final exposure compensation value. In this way, it is possible to achieve the accurate restoration of the brightness of the portrait portion and the background portion in the image, reduce the possibility that the portrait portion of the image is underexposed and the brightness is distinctly dark under the backlight condition, and the visual effect may be improved.

Figure 4:
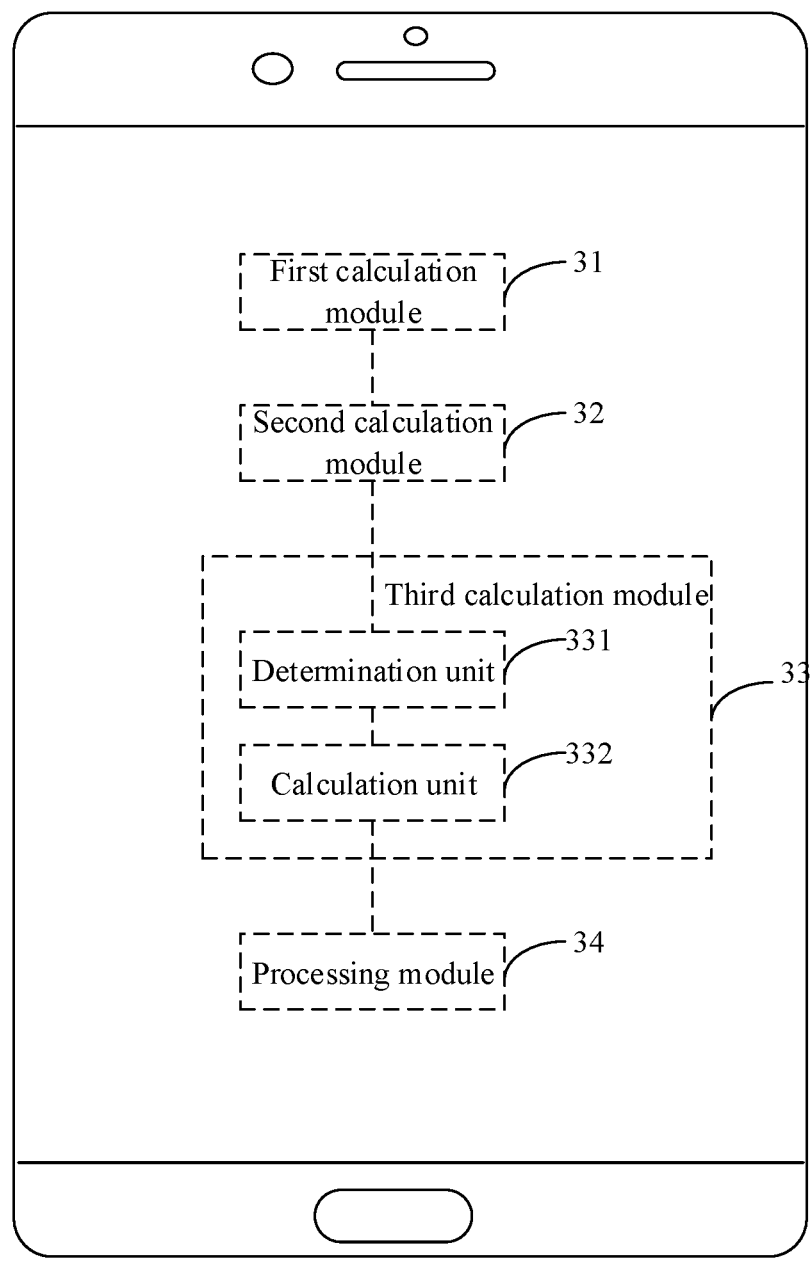
FIG. 4 is another schematic view of an image processing apparatus according to some embodiments of the present disclosure.

Based on the foregoing embodiments, a possible implementation of an image processing apparatus may be further provided in some embodiments of the present disclosure. FIG. 4 is another schematic view of an image processing apparatus according to some embodiments of the present disclosure. As shown in FIG. 4, on the basis of the previous embodiments, the third calculation module 33 may specifically include a determination unit 331 and a calculation unit 332.

The determination unit 331 may be configured to respectively determine, according to an area ratio of the portrait portion to the image, a first weight value corresponding to the first exposure compensation value and a second weight value corresponding to the second exposure compensation value.

The calculation unit 332 may be configured to add a product of the first exposure compensation value and the first weight value and a product of the second exposure compensation value and the second weight value to acquire the final exposure compensation value. More specifically, the calculation unit 332 may be configured to acquire a first product of the first exposure compensation value and the first weight value, acquire a second product of the second exposure compensation value and the second weight value, and acquire the final exposure compensation value may be acquired by adding the first product to the second product.

Furthermore, in another possible implementation according to some embodiments of the present disclosure, the image processing apparatus may further include: an acquisition module and an extraction module. The acquisition module may be configured to acquire a depth of field of the image. The extraction module may be configured to extract the portrait portion of the image according to the depth of field.

Furthermore, in another possible implementation according to some embodiments of the present disclosure, the image processing apparatus may further include: a detection module and a triggering module. The detection module may be configured to perform a face detection on the image and acquire a face detection result. The triggering module may be configured to trigger the acquisition module to acquire the depth of field of the image in response to the face detection result indicating that the image includes a face. The first exposure compensation value may be determined as the final exposure compensation value in response to the face detection result indicating that the image does not include a face, as described before.

It should be noted that, the explanation of the image processing method according to the above embodiments may also be applicable to the image processing apparatus according to some embodiments, and will not be repeated here.

In some embodiments, the exposure difference between the portrait portion and the background portion may be fully considered. The second exposure compensation value may be individually obtained from the portrait portion of the image. That is to say, the second exposure compensation for the portrait portion may be acquired independently/separately from the first exposure compensation for the global portion of the image. The final exposure compensation value may be acquired by combining the first exposure compensation value for the global portion of the image with the second exposure compensation value for the portrait portion of the image. The exposure compensation may be processed to image according to the final exposure compensation value. In this way, it is possible to achieve the accurate restoration of the brightness of the portrait portion and the background portion in the image, reduce the possibility that the portrait portion of the image is underexposed and the brightness is distinctly dark under the backlight condition, and the visual effect may be improved.

Figure 5:
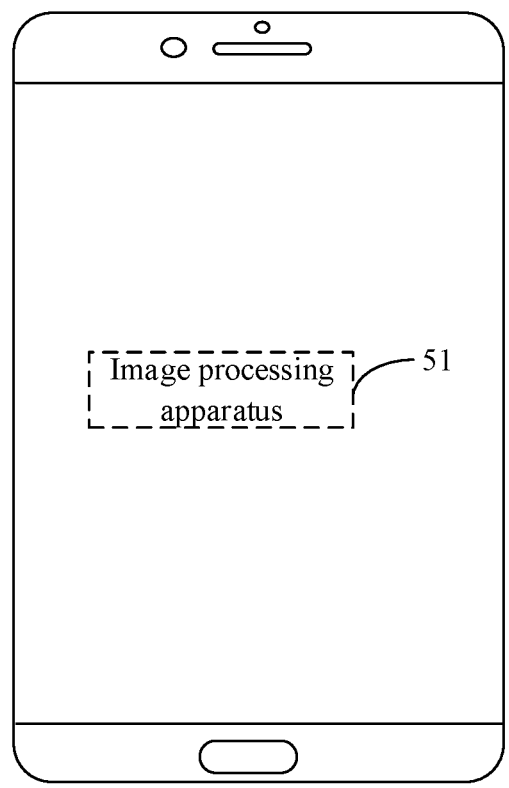
FIG. 5 is a schematic view of a terminal according to some embodiments of the present disclosure.

In order to implement the above embodiments, a terminal may be further provided in some embodiments of the present disclosure. FIG. 5 is a schematic view of a terminal according to some embodiments of the present disclosure. As shown in FIG. 5, the terminal may include the image processing apparatus 51 as described in the above embodiments.

It should be noted that, the explanation of the image processing method according to the above embodiments may also be applicable to the terminal according to some embodiments, and will not be repeated here.

In some embodiments, the exposure difference between the portrait portion and the background portion may be fully considered. The second exposure compensation value may be separately obtained from the portrait portion of the image. That is to say, the second exposure compensation for the portrait portion may be acquired independently/separately from the first exposure compensation for the global portion of the image. The final exposure compensation value may be acquired by combining the first exposure compensation value for the global portion of the image with the second exposure compensation value for the portrait portion of the image. The exposure compensation may be processed to image according to the final exposure compensation value. In this way, it is possible to achieve the accurate restoration of the brightness of the portrait portion and the background portion in the image, reduce the possibility that the portrait portion of the image is underexposed and the brightness is distinctly dark under the backlight condition, and the visual effect may be improved.

Figure 6:
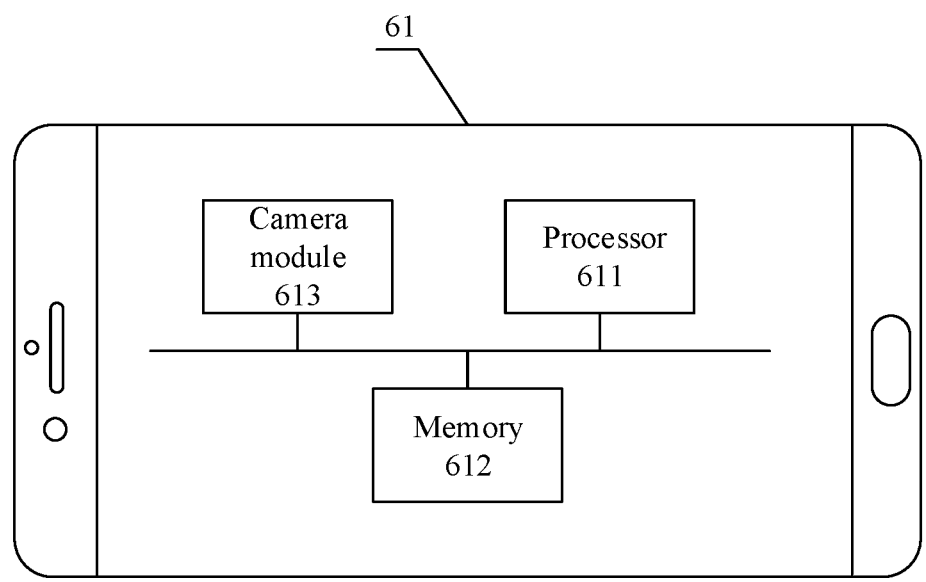
FIG. 6 is another schematic view of a terminal according to some embodiments of the present disclosure.

In order to implement the above embodiments, another terminal may be further provided according to some embodiments of the present disclosure. FIG. 6 is another schematic view of a terminal according to some embodiments of the present disclosure. As shown in FIG. 6, the terminal may include one or more components comprising: a housing 61, a processor 611, a memory 612, and a camera module 613. The processor 611, the memory 612, and the camera module 613 may be disposed in the housing 61. The camera module 613 may be configured to acquire an image. The processor 611 may be configured to run a program corresponding to an executable program code by reading the executable program code stored in the memory 612, such that the processor 611 is caused to execute the aforementioned image processing methods. The image processing methods may include: obtaining a first exposure compensation value from a global portion of an image; obtaining a second exposure compensation value from a portrait portion of the image; obtaining a final exposure compensation value according to the first exposure compensation value and the second exposure compensation value; and processing, according to the final exposure compensation value, exposure compensation to the image.

It should be noted that, the explanation of the image processing methods according to the above embodiments may also be applicable to the terminal according to some embodiments, and will not be repeated here.

In some embodiments, the exposure difference between the portrait portion and the background portion may be fully considered. The second exposure compensation value may be individually obtained from the portrait portion of the image. That is to say, the second exposure compensation for the portrait portion may be acquired independently/separately from the first exposure compensation for the global portion of the image. The final exposure compensation value may be acquired by combining the first exposure compensation value for the global portion of the image with the second exposure compensation value for the portrait portion of the image. The exposure compensation may be processed to image. In this way, it is possible to achieve the accurate restoration of the brightness of the portrait portion and the background portion in the image, reduce the possibility that the portrait portion of the image is underexposed and the brightness is distinctly dark under the backlight condition, and the visual effect may be improved.

In the description of the present specification, the description with reference to the terms "one embodiment", "some embodiments", "illustrative embodiment", "example", "specific example", or "some examples", and the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, various embodiments or examples described in the specification and features of various embodiments or examples, may be incorporated and combined by those skilled in the art in case of an absence of confliction.

In addition, terms such as "first", "second", and the like, are used herein for purposes of description, and are not intended to indicate or imply relative importance or significance or to imply the number of indicated technical features. Thus, the feature defined with "first", "second", and the like may include one or more of such a feature. In the description of the present disclosure, it should be noted that, "a plurality of" means two or more, unless specified otherwise.

Any process or method description in the flowcharts or described in other means herein may be understood to represent a module, a segment or a portion of codes including one or more executable instructions for implementing the blocks of a custom logic function or process. Besides, the scope of the embodiments of the present disclosure may include additional implementations, in which the functions may not be performed in the shown or discussed order, and may be performed in a substantially simultaneous manner or in an opposite order, according to the functions involved. This will be understood by those skilled in the art of the present disclosure.

The logic and/or steps described in other manners herein or shown in the flow chart, for example, a particular order list of executable instructions for realizing the logical function, may be specifically achieved in any computer-readable medium to be used by an instruction execution system, a device or an equipment (such as a system based on computers, a system including processors or other systems capable of acquiring an instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium may include but be not limited to: an electronic connection (an electronic device) with one or more wires, a portable computer enclosure (a magnetic device), a random-access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), and the like.

Those skilled in the related art should be noted that all or part of actions in the above-described embodiments can be implemented by program instructions executable in hardware. The program instructions are stored in computer-readable medium and the program instructions are performed for at least one of actions at the blocks.

Furthermore, each of functional units may be integrated in one processing unit or be a separate physical unit. For example, two or more units are integrated in a single unit. The integrated units may be implemented in a form of hardware or software functional module. In one embodiment, when the integrated units are implemented in the form of a software functional module which is sold or used as an independent product, the integrated units may be stored in a computer-readable storage medium.

The computer-readable storage medium may be a read-only memory, a magnetic disk or optical disk. Although the embodiments of the present disclosure are shown and described in the above, however, it should be understood that, the foregoing embodiments of the present disclosure are illustrative rather than limiting of the present disclosure. Those skilled in the art may make various modifications, changes, equivalent replacements, and transformations within the scope of the present disclosure.

What is claimed is:

1. A method for image processing, comprising:
   obtaining a first exposure compensation value from a global portion of an image;
   obtaining a second exposure compensation value from a portrait portion of the image;
   obtaining a final exposure compensation value according to the first exposure compensation value and the second exposure compensation value; and
   processing, according to the final exposure compensation value, exposure compensation to the image;
   wherein the obtaining the final exposure compensation value according to the first exposure compensation value and the second exposure compensation value, comprises:
   determining, according to an area ratio of the portrait portion to the image, a first weight value corresponding to the first exposure compensation value and a second weight value corresponding to the second exposure compensation value; and
   acquiring a first product of the first exposure compensation value and the first weight value, acquiring a second product of the second exposure compensation value and the second weight value, and acquiring the final exposure compensation value by adding the first product to the second product.

2. The method according to claim 1, wherein a sum of the first weight value and the second weight value is equal to 1, and the second weight value is positively correlated with the area ratio.

3. The method according to claim 1, further comprising:
   acquiring a depth of field of the image; and
   extracting, according to the depth of field, the portrait portion of the image.

4. The method according to claim 3, further comprising:
   performing a face detection on the image and acquiring a face detection result;
   acquiring the depth of field of the image in response to the face detection result indicating that the image includes a face; and
   determining the first exposure compensation value as the final exposure compensation value in response to the face detection result indicating that the image does not include a face.

5. The according to claim 3, wherein the acquiring the depth of field of the image comprises:
   acquiring the depth of field of the image by using a dual-camera or a Red Green Blue Depth camera.

6. The method according to claim 1, wherein the obtaining the first exposure compensation value from the global portion of the image, comprises:
   obtaining an average value of brightness values of all pixel points of the image; and
   determining the first exposure compensation value based on the average value.

7. The method according to claim 1, wherein the obtaining the first exposure compensation value from the global portion of the image, comprises:
- obtaining a maximum value of brightness values of all pixel points of the image; and
- determining the first exposure compensation value based on the maximum value.

8. A terminal, comprising:
- a housing,
- a camera module, disposed in the housing and configured to acquire an image;
- a memory, disposed in the housing and configured to store an executable program; and
- a processor, disposed in the housing and configured to execute the executable program to cause the processor to execute an image processing method; wherein the method comprises:
  - obtaining a first exposure compensation value from a global portion of the image;
  - obtaining a second exposure compensation value from a portrait portion of the image;
  - obtaining a final exposure compensation value according to the first exposure compensation value and the second exposure compensation value; and
  - processing, according to the final exposure compensation value, exposure compensation to the image;
- wherein the obtaining the final exposure compensation value according to the first exposure compensation value and the second exposure compensation value, comprises:
- determining, according to an area ratio of the portrait portion to the image, a first weight value corresponding to the first exposure compensation value and a second weight value corresponding to the second exposure compensation value; and
- acquiring a first product of the first exposure compensation value and the first weight value, acquiring a second product of the second exposure compensation value and the second weight value, and acquiring the final exposure compensation value by adding the first product to the second product.

9. The terminal according to claim 8, further comprising:
- performing a face detection on the image and acquiring a face detection result;
- acquiring a depth of field of the image in response to the face detection result indicating that the image includes a face; and
- extracting, according to the depth of field, the portrait portion of the image.

10. A non-transitory computer-readable storage medium storing a computer program which, when executed by a processor, cause the processor to execute an image processing method; wherein the method comprises:
- obtaining a first exposure compensation value from a global portion of an image;
- obtaining a second exposure compensation value from a portrait portion of the image;
- obtaining a final exposure compensation value according to the first exposure compensation value and the second exposure compensation value; and
- processing, according to the final exposure compensation value, exposure compensation to the image;
- wherein the obtaining the final exposure compensation value according to the first exposure compensation value and the second exposure compensation value, comprises:
- determining, according to an area ratio of the portrait portion to the image, a first weight value corresponding to the first exposure compensation value and a second weight value corresponding to the second exposure compensation value; and
- acquiring a first product of the first exposure compensation value and the first weight value, acquiring a second product of the second exposure compensation value and the second weight value, and acquiring the final exposure compensation value by adding the first product to the second product.

11. The non-transitory computer-readable storage medium according to claim 10, further comprising:
- performing a face detection on the image and acquiring a face detection result;
- acquiring a depth of field of the image in response to the face detection result indicating that the image includes a face; and
- extracting, according to the depth of field, the portrait portion of the image.

* * * * *